(12) United States Patent
Hansen

(10) Patent No.: US 8,856,325 B2
(45) Date of Patent: Oct. 7, 2014

(54) NETWORK ELEMENT FAILURE DETECTION

(71) Applicant: Robert Hansen, Austin, TX (US)

(72) Inventor: Robert Hansen, Austin, TX (US)

(*) Notice: Subject to any disclaimer, the term of this patent is extended or adjusted under 35 U.S.C. 154(b) by 0 days.

(21) Appl. No.: 13/784,113

(22) Filed: Mar. 4, 2013

(65) Prior Publication Data

US 2013/0275595 A1    Oct. 17, 2013

Related U.S. Application Data

(60) Provisional application No. 61/625,649, filed on Apr. 17, 2012.

(51) Int. Cl.
| | |
|---|---|
| G06F 15/173 | (2006.01) |
| H04L 12/923 | (2013.01) |
| G06F 15/16 | (2006.01) |
| G06F 17/00 | (2006.01) |

(52) U.S. Cl.
CPC .................................. H04L 47/762 (2013.01)
USPC ........... 709/224; 709/203; 709/219; 715/234; 715/237

(58) Field of Classification Search
None
See application file for complete search history.

(56) References Cited

U.S. PATENT DOCUMENTS

| | | | |
|---|---|---|---|
| 7,058,720 B1* | 6/2006 | Majidimehr | 709/231 |
| 8,346,909 B2* | 1/2013 | Dan et al. | 709/224 |
| 2005/0160065 A1* | 7/2005 | Seeman | 707/1 |
| 2010/0211639 A1* | 8/2010 | Shi | 709/206 |
| 2011/0270975 A1* | 11/2011 | Troup | 709/224 |
| 2011/0289108 A1* | 11/2011 | Bhandari et al. | 707/769 |
| 2012/0295243 A1* | 11/2012 | Capone et al. | 434/362 |

OTHER PUBLICATIONS

Wikipedia, "ALT Attribute".*

* cited by examiner

Primary Examiner — Wen-Tai Lin
(74) Attorney, Agent, or Firm — Mark R. Hennings

(57) ABSTRACT

A network element failure detector provides a fallback mechanism when external resources fail to load. For example, a "contingency" tag allows a consumer to load local resources when third party resources specified by a webpage developed by a service provider fail to load. Thus, the webpage developer can specify the functionality of a webpage when the referenced third party external resource fails to load. The consumer can also alert the service provider and/or the third party of the failure to load the referenced third party external resource.

30 Claims, 6 Drawing Sheets

NETWORK ELEMENT FAILURE DETECTION

BACKGROUND

Network-enabled applications are applications that use communication networks to share information between various devices, each of which might be operated by the same or different user(s). The network-enabled applications include applications such as browser engines, messaging interfaces, remote desktops, and the like that allow users to easily browse, select, and manipulate items being viewed using a network-enabled application. The network-enabled application receives one or more communications (such as code for instantiating webpages) from a service provider that is often encoded in the form of a language (such as the hypertext markup language HTML), which contains elements that describe the structure and functionality of the content that is received by the content user.

An internet browser is an example of a content browser that allows users to easily browse and select items being viewed using the browser. The content browser receives one or more communications (such as webpages) from a service provider that is often encoded in the form of a markup language, which describes the structure and functionality of the content that is received by the content user.

The communication (such as a received webpage) often references resources that are hosted by third party service providers. One of the primary reasons external resources are used is to limit the amount of locally developed software and/or to reduce bandwidth requirements of hosting certain kinds of content (e.g., video content). However, the use of external resources often diminishes the integrity of the intended user interface when the external resources fail to load. For example, when an external resource fails to load (and/or stalls), conventional browsers do not provide a convenient way for web developers to provide alerts that is not resource specific. This problem is compounded when multiple external resources are presented simultaneously using "widget-heavy" webpages because, for example, the resource-specific solutions for detecting that third party content has failed to load are normally not portable and do not provide generic solutions that are useable without modification across a variety of platforms.

DETAILED DESCRIPTION

The following discussion is directed to various exemplary embodiments of the disclosure. Although one or more of these exemplary embodiments may be preferred, the exemplary embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical, optical and/or wireless connection. Thus, if a first device couples to a second device, that connection can be made through a direct connection, or through an indirect connection via other devices and connections.

The term "domain" as used herein refers to either a domain or a portion of the domain ("subdomain") if any. Thus, the term "subdomain" can be used to refer to a portion of the "domain." A subdomain can be, for example, a domain name system (DNS) server record. For example, the name "www.example.com" can be used in a localized context to refer to a domain (notwithstanding the fact that "www.example.com" is itself a subdomain of "example.com"). While net-enabled applications such as browsers follow a "same origin" policy and tend to use the longer version "www.example.com" as an origin domain name, the net-enabled applications also use the shorter version "example.com" for certain purposes (such as for cookies that are set with the domain switch). Thus all subdomains of the domain "example.com" include "no-subdomains" (such as "http://example.com/" and "http://whatever.example.com/") and include the more-specific subdomains (such as www.example.com). The term "render" can be used to describe a change rendered in the logical structure of a Document Object Model (DOM) as well as a graphical rendering of the DOM element. The term "portion" means an entire portion or a portion that is less than the entire portion.

Figure 1:
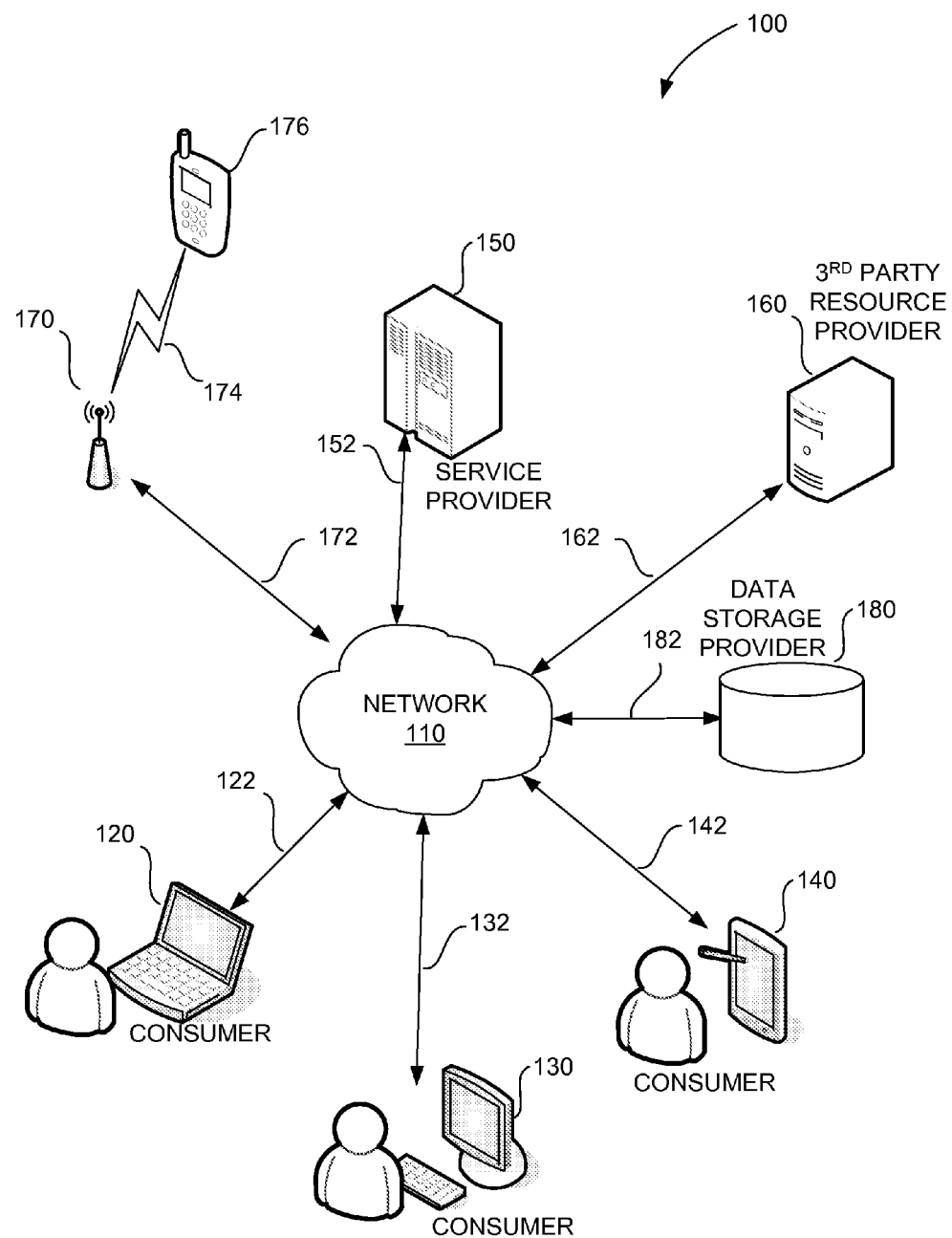
FIG. 1 is a network diagram illustrating a network that is suitable for practicing aspects of network element failure detection in accordance with exemplary embodiments of the disclosure.

FIG. 1 is a network diagram illustrating a network that is suitable for practicing aspects of network element failure detection in accordance with exemplary embodiments of the disclosure. Network system 100 includes consumer 120, 130, and 140 (machines, for example), service provider 150, third party resource provider 160, cellular communications provider 170, and data storage provider 180. Consumers 120, 130, and 140 access and communicate with network 110 using communication links 122, 132, and 142 respectively. Each of the consumers 120, 130, and 140 can be (or internally provide functions of) the (illustrative) computing device 200 discussed below with reference to FIG. 2.

Network 110 typically includes a publically accessible network such as the internet, but other networks (including private networks) can be used. Thus, network 110 is typically a collection of networks (and gateways) that typically use a TCP/IP (transmission control protocol/Internet protocol) suite of protocols for packet-based communications. The Internet typically employs high-speed data communication lines between major nodes or host computers, but even bandwidth between the major nodes is subject to degradation through satellite outages, hardware faults, denial of service attacks, oversubscription of services, and the like. The network connections are shown for the purpose of illustration, and other ways of establishing a communications link between computers (such as using firewalls, as discussed below) can be used.

Consumers 120, 130, and 140 access the network 110 to access networked se service providers of services such as 150, third party resource provider 160, cellular communications provider 170, and data storage provider 180. Service provider 150 accesses network 110 via communication link 152, whereas third party resource provider 160 accesses network 110 via communication link 162. Cellular communications provider 170 accesses network 110 via communication link 172 and provides, for example, further connectivity to cellular devices 176 via a cellular network 174. Data storage provider 180 accesses network 110 via communication link 182 to provide, for example, secure backup systems for consumer 120 data. The actual data processing systems of network system 100 may include additional servers, clients, peers, and other devices not illustrated. Each of the service provider 150, third party resource provider 160, cellular communications provider 170, cellular devices 176, and data storage provider 180 can be (or internally provide functions of) the (illustrative) computing device 200 discussed below with reference to FIG. 2.

Figure 2:
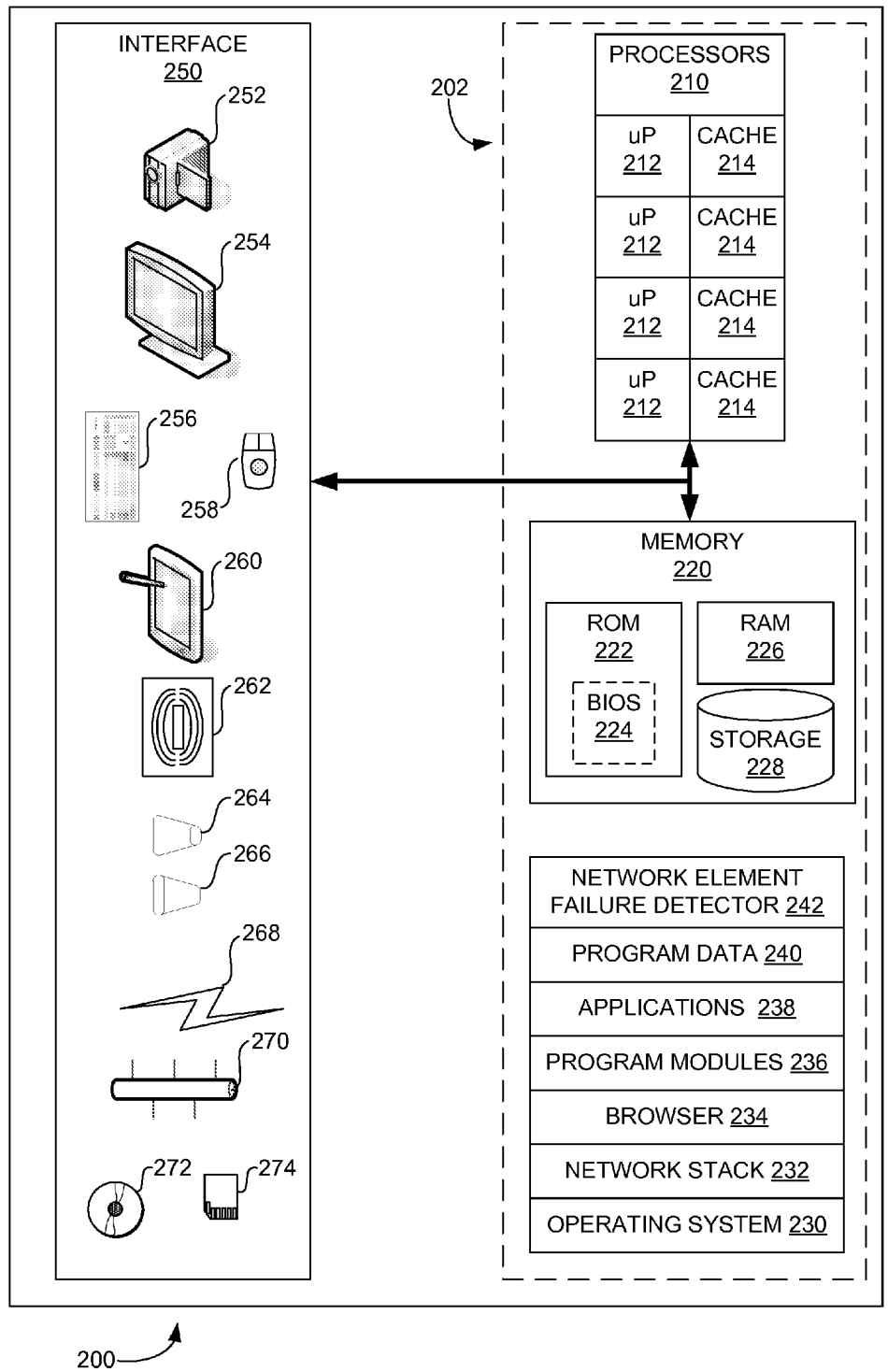
FIG. 2 shows an illustrative computing device in accordance with exemplary embodiments of the disclosure.

FIG. 2 shows an illustrative computing device 200 in accordance with exemplary embodiments of the disclosure. For example, the computing device 200 includes a processing system 202 that is arranged to perform specific tasks in response to applications 238 and program data 240. Processing system 202 is often incorporated into a computing device such as a mobile device, a personal digital assistant, a personal computer, a dedicated web-enabled appliance, a kiosk terminal, automotive electronics, or any other type of networked electronic system or subsystem.

The processing system 202 includes processors 210 and memory 220. Processors 210 may include one or more microprocessor (uP) cores 212a, 212b, 212c, and 212d, each of which is optionally coupled to a respective, local cache 214a, 214b, 214c, and 214d Memory 220 includes a ROM (read-only memory) 222, RAM (random-access memory) 226, and storage 228 (such as a "hard" disk). ROM 222 optionally includes BIOS (basic input/output system) 224, which typically includes low-level firmware-based drivers for accessing, for example, low-level, hardware-based elements of computing device 200.

Memory 220 includes instructions and data for executing (software) applications 238 (for example), that when executed by processing system 202, perform any suitable function associated with the computing device 200. For example, the processing system 202 executes software (including firmware) and data components such as operating system 230, network stack 232, browser 234, program modules 236, applications 238, program data 240, and network element failure detector 242.

Processing system 202 is accessible to users and non-local components using interface 250. Interface 250 provides a user interface that is typically arranged to provide output to and receive input from the user during the execution of the software applications 238. The output to the user is provided by devices such as the display 254 (including indicator lights and image projectors), a speaker 264, vibrations 262, and the like. The input from the user is received using keyboard 256, mouse (and/or trackball) 258, touch/stylus screen 260, audio input 266 and/or video input 252. Other devices can be used such as keypads, switches, proximity detectors, and the like.

The interface 250 is also arranged to transmit communications to and from other computers across a network. Wireless link 268 permits communications using a modulated optical and/or electromagnetic carrier (such as cellular telephone communications). Cabled link 270 permits communications over a wired and/or optical link (such as optical Ethernet and/or Ethernet). The wireless link 268 and cabled link 270 are optionally employed between other network-enabled devices to establish wide-area networks, local-area networks, private networks, and the like. Additionally, tangible media such as disk 272 or "flash" ROM 274 (and the like) are used to store data and instructions and are read from and/or written to by interface 250 in the course of execution of the network element failure detector 242, for example. The media is or can be non-transitory media.

Figure 3:
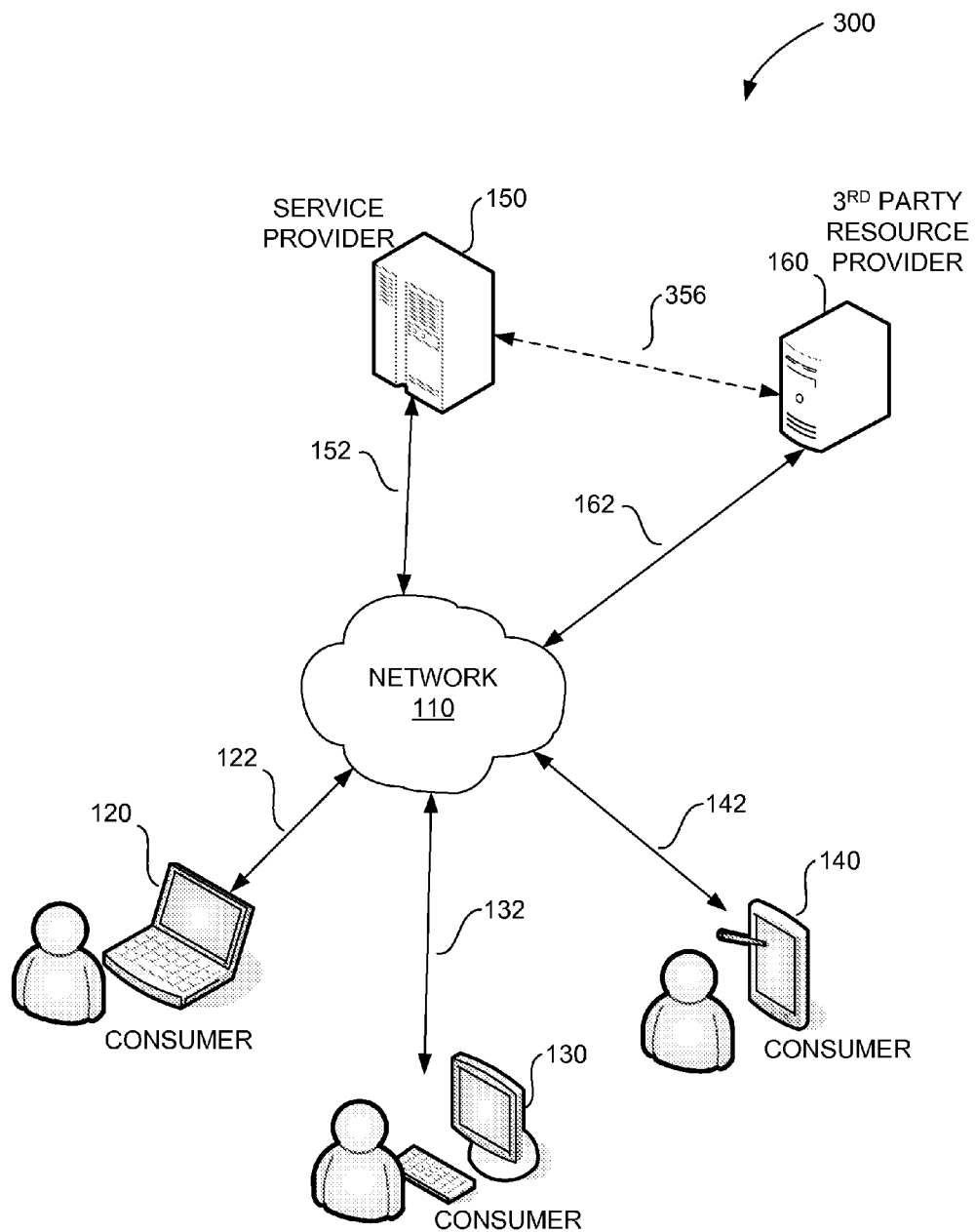
FIG. 3 is a network diagram illustrating a network that includes network element failure detection in accordance with exemplary embodiments of the disclosure.

FIG. 3 is a network diagram illustrating conjunction with FIG. 2 a network that includes network element failure detection in accordance with exemplary embodiments of the disclosure. Network system 300 includes service provider 150 and third party resource provider 160, as discussed above. Service provider 150 is arranged to provide networked content (such as services, data and/or applications, and the like) to consumer 120 via network 110. The content and services are generally provided in the form of communications such as webpages, where the webpages (and other communications) often contain references (e.g., "links") to "external" resources that are to be provided by the third party resource provider 160 (which is also a networked service provider). The content and services can include banking, information storage, search engines, blogging, and the like, and can be networked via the Internet or private (such as a virtual private) network The network element failure detector 242 of consumer 120 is arranged to detect, for example, when the external resources are not timely provided to the consumer 120. The network element failure detector 242 is also arranged to initiate sending a notification of the failure to the service provider 150 via network 110.

A "backchannel" 356 is optionally arranged between service provider 150, and third party resource provider 160. The backchannel 356 is arranged to, for example, permit alert messages and responses to be sent between service provider 150 and third party resource provider 160 if any of (or portion of) network 110, communication link 162, and communication link 162 fails.

Service provider 150 is a server (or a set of servers that are presented as a single server or a "virtual" server for processing requests). The consumers 120, 130, and 140 are typically clients with respect to the server (e.g., service provider 150). The consumers 120, 130, and 140 are, for example, personal computers or network computers.

Figure 4:
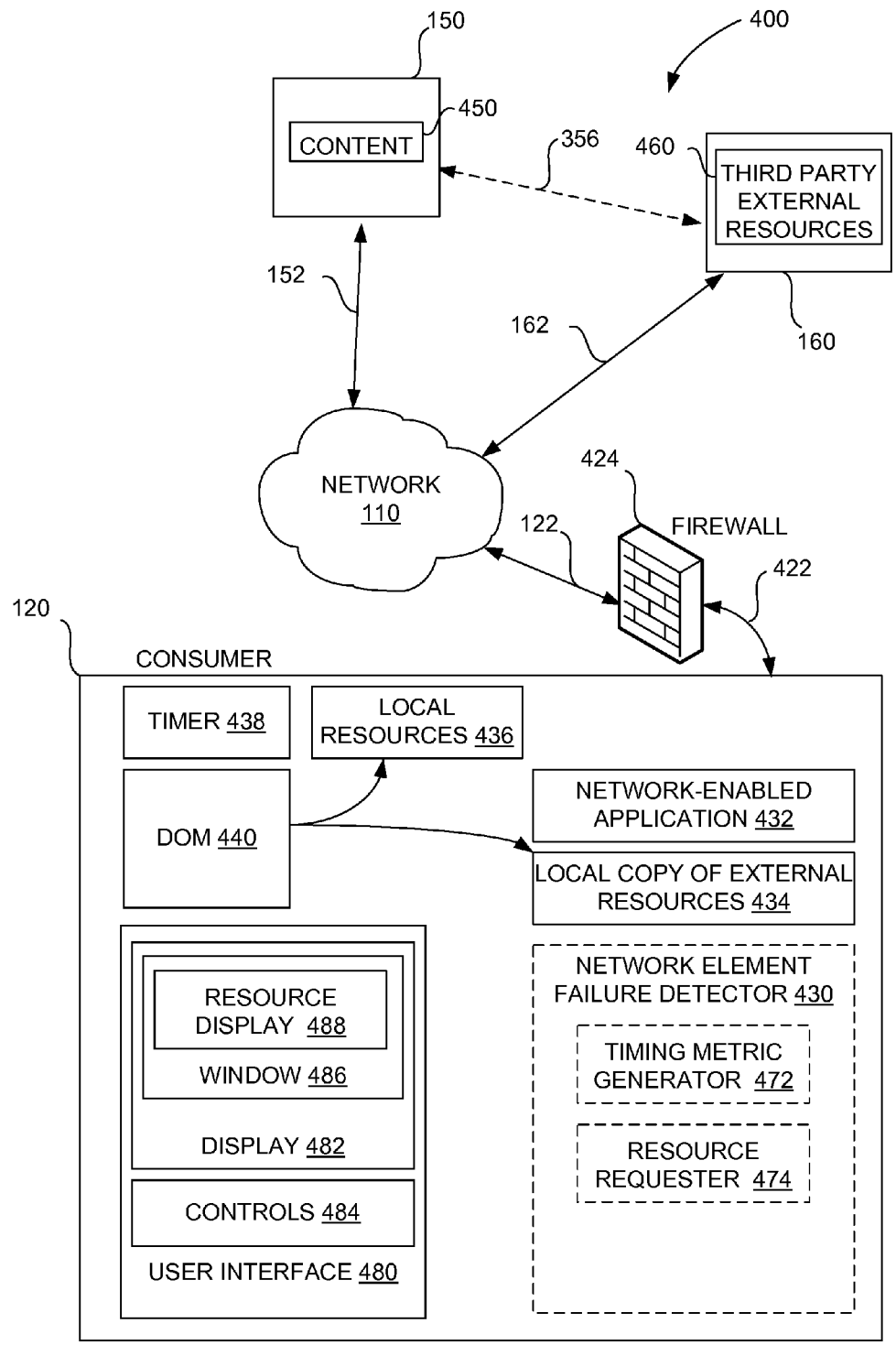
FIG. 4 is a logic diagram illustrating a network element failure detector in accordance with exemplary embodiments of the disclosure.

FIG. 4 is a logic diagram illustrating a network element failure detector in accordance with exemplary embodiments of the disclosure. Network system 400 includes, for example: consumer 120, service provider 150, and third party resource provider 160. Consumer 120 is arranged to (more securely) communicate with network 110 using communication links 122, firewall 424, and communication link 422.

Consumer 120 typically includes a network-enabled application (e.g., a browser engine) 432 that is arranged to conduct communications between service provider 150 and consumer 120. For example, network-enabled application 432 includes a browser such as Chrome, Firefox, Internet Explorer, and the like. A user performs an action such as following a bookmark, or clicking on a local link, opening a Word or PDF document, entering a URL (universal resource locator) or IP (Internet protocol) address, entering account numbers, or selecting an action to perform on content 450 (or a portion thereof) hosted by service provider 150 and the like. Content 450 can include services, accounts, media, and the like.

Service provider 150 responds by sending a communication to the consumer 120. The communication is received by a network interface of an operating system of the consumer 120 and the communication is passed to the network-enabled application 432 for decoding and rendering, for example, using a window in the display of consumer 120.

The communication is often a webpage written in a markup language, although other formats can be used such as style sheets, JavaScript reference, and the like. The webpage often contains elements that address content provided by the service provider 150 as well as content provided by one or more third party resource providers 160. The references in the received communication are, for example, instantiated using a DOM 440 (document object model). The DOM 440 can be used to trigger the counting of timer 438. The DOM 440 can be arranged as a parent DOM that is associated with one or more children DOMs, wherein each of the DOMs can be associated with a network resource that is determined by the received communication.

The network-enabled application 432 parses the received communication in accordance with the format used to encode the information encoded in the received communication. As the network-enabled application 432 parses the received communication, the network-enabled application 432 constructs a DOM 440 that delineates the structure and the function of the encoded information. The DOM 440 is arranged to render both content of requested third party resources (such as third party resources 460) and local references on the same website, for example. The rendered content can be used to manage a window 486 of a webpage (conveyed by the encoded information) for display in the display 482 (typically via a BIOS of the operating system). The display 482 is used to provide visual indications to a user and to prompt (e.g., query) the user for input. The user input is captured using controls 484 (such as by a keyboard and/or a mouse) of the user interface 480.

Window 486 is a (e.g., computer program) application window that is arranged to display program output and to help capture user input. Window 486 is, for example, a window of a network-enabled application 432 and is associated with resource display 488 that is arranged to be viewed and/or manipulated by a user using controls 484. The resource display 488 is used to display resources such as local copy of external resources 434, local resources 436, and/or third party external resources 460. User interface 480 is used, for example, by a user to view and manipulate resource display related to services provided by the service provider 150.

The DOM 440 is also arranged to load requested third party external resources 460 into local copy of external resources 434 and to maintain local resources 436 that are used to in place of the third party external resources 460 when the third party external resources 460 fail to load. The local resources 436 can be loaded from the consumer 120, service provider 150, third party resource provider 160, or other network resources. The communication received from service provider 150 parsed by the DOM 440 can contain information used by (in part or in full) the local resources 436. Likewise, communication can provide a link to be used for downloading information to the local resources 436. For example, downloading the (e.g., replacement) information can be started before accessing the third party external resources 460 or before a timing metric (discusses below) has been exceeded for accessing the third party external resources 460.

Often, the encoded information includes a reference to a resource that is not provided (directly) by the service provider 150. The reference is generally provided in the form of a link (such as a URL or IP address) that is used to retrieve the external reference (third party external resources 460 hosted by third party resource provider 360, for example). Thus, the network-enabled application 432 attempts to load the referenced external reference to the third party external resources 460 by sending a request via the network 110 to the addressed third party resource provider 160 having the referenced resource of the third party external resources 460.

The third party resource provider 160 responds by sending a communication to the consumer 120. However, the third party external resources 460 might not be accessible to the consumer 120 because of the firewall 424, intermittent issues associated with the third party that might not be immediately detectable by the service provider, and/or bandwidth issues of the third party resource provider 160, for example.

Also, it is often difficult for the service provider 150 to determine which third party external resources 460 are accessible to the consumer 120. Detecting which third party external resources 460 are accessible to the consumer 120 is often difficult because the detection typically requires instantiating a resource-intensive process (such as a plugin) that is local to a consumer browser, and/or because providing a JavaScript "patch" might not function properly (depending on the type of consumer 120 browser used and depending on how the third party resource provider 160 responds to various requests for the third party content).

Thus, when one or more of the third party external resources 460 fail to load, the image and/or functionality of the browser webpage does not correctly reflect the intent of the developer who programmed the page and/or the user experience of the person operating consumer 120 is degraded. When one or more of the third party external resources 460 fail to load (for example), the loss in functionality might prohibit the ability to login to a website or even the ability to see (and/or use) the third party external resources 460 that loaded correctly.

The consumer 120 includes a network element failure detector 430 that includes components such as a timing metric generator 472 and a resource requestor 474. (The components of the network element failure detector 430 can be distributed and thus include a portion of other components such as timer 438 and DOM 440.) The timing metric generator 472 is arranged to generate a timing metric in response to a transmission of a request by a network-enabled application for a third party external resource that has a network address that is specified by a service provider (e.g., 150) in a first network response. When the timing metric has a value that exceeds a threshold, the local resource requester 474 generates a request for a local resource that is specified by the service provider in the first network response.

Thus, the disclosed network element failure detector 430 provides a fallback mechanism when external resources fail to load. The fallback mechanism can be typically implemented as a program code that is written in a format that is valid input for the parser of the network-enabled application 432 of the local consumer 120. Valid formats include HTML (hypertext markup language), CSS (cascading style sheets), JavaScript and the like. For example, a "contingency" tag is disclosed for use in HTML to specify an alternate location (such as a local resource 436 that is resident "behind" the firewall 424). Examples of contingency tags include:

```
<link rel="stylesheet"
    type="text/css" href="http://remote.host/css.css"
```

```
        contingency="/css/css.css"
        alert="/alert.aspx?error=css_load_failure" >
    <script type="text/javascript" src="http://remote.host/js.js"
        contingency ="/js/js.js"
        alert="/alert.aspx?error=js_load_failure"></script>
    <img src="http://remote.host/image/img.jpg"
        contingency ="/img/img.jpg"
        alert="/alert.aspx?error=image_load_failure">
```

The "contingency" tag is used to define the local resource 436 that should be loaded if the specified remote third party external resource 460 fails to load. Accordingly, the disclosed network element failure detector 430 provides a fallback mechanism that is browser-agnostic and can be executed on an arbitrary browser (e.g., that can function using on any number of types of commonly used browsers) that does not necessarily use JavaScript. The request for the local resource 436 is specified as a "contingency," for example, such that the programmer of the webpage can control the appearance and behavior of the displayed webpage when the requested third party external resource 460 of the third party external resources 460 has (for example) failed to load (or is slow to load). As indicated, modification of the standard specification used for the (e.g., markup) language of the webpage loaded allows contingencies for a wide range of external resources in the case any of those types of third party external resources 460 fails to load.

When the request is transmitted to the third party resource provider 160 for the third party external resource 460 across the network 110, the time of the request is preserved (such as by noting the machine time or by starting a timer 438). In response to a timing interrupt (or timer expiry, or operating system task scheduler), the request-status is checked by comparing the elapsed time and whether (or the degree to which) the requested third party external resource 460 has loaded. For example, the current loading status can be an indication of the degree (such as a percentage or rate) to which a response to the request for the identified third party external resource 460 from the third party resource provider 160 has been received.

When the request-status is checked, a timing metric is generated using information from the timer 438. The timing metric is an indication of a current loading status of the requested third party external resource 460 and an indication of the time of the transmission of the request for the third party external resource 460. When the timing metric indicates that the requested external resource of the third party external resources 460 has failed to (timely) load (e.g., when the timing metric has a value that exceeds a threshold), a request for a local resource is made.

The timing metric can be an indication of a current loading status of a requested third party external resource relative to the time of a transmission of the request by the network-enabled application for the third party external resource. Also, the timing metric can be determined in response to the degree (or the rate at which) the requested the third party external resource is loading (for example, due to one or more subsequent communications that are used in the process of loading the requested third party external resources).

The request for the local resource 436 is specified as a "contingency," for example, such that the programmer of the service provider 150 webpage can control the appearance and behavior of the displayed webpage when the requested external resource of the third party external resources 460 has failed to load. The threshold can be predetermined or determined upon network response time factors (e.g., "httping" response times).

The alert mechanism is provided to alert service provider 150 webmasters that external resources of the third party external resources 460 have failed to load (or have failed to load with in a predetermined time, such as within a timer interval), which could have various kinds of adverse effects on the page load time, user interface integrity, and site functionality. The alert includes a notification of the timing metric having a value that exceeds a threshold relative to the request for the external resource. The notification includes the amount by which the value of the timing metric exceeds the threshold.

Also the timing metric can be selected in response to the type of resource that is identified by the external resource of the third party external resources 460. For example, the timing metric is selected in response to a timing property of an object, wherein the timing property indicates the relative importance of the object to the page. Thus, different magnitudes of the timing property are assigned based on whether the object is, for example, a "signin" object or a banner ad. The magnitude of the assigned timing property is also assigned based on factors such as the placement of the object (such as a banner ad) on the page, the identity of the third party associated with the object, the size of the object when displayed, and the like.

The timing metric can also be modified in response to one or more current system load factors and/or operating conditions, such as ping response times, percentage of network utilization, and the like. The threshold can be determined using varying factors such as a time period, numbers of a events of a type selected from a group of selected system events (including clock events), and other factors that can slow response times of in the loading of a requested third party resource.

In addition, multiple timing metrics can be modified in response to system performance to multiple third party resources that have been specified by one (or more) network responses (such as the webpage received from the service provider 150). Thus, one of multiple local resources can be allocated for respective third party resource that is, for example, not being loaded within a threshold. For example, the webpage received from the service provider 150 can contain multiple references to one or more third party resources, where the references to the third party resources can point to the same or different network addresses of third party resource providers.

The timing metric is also used to detect the operation of ad- (advertisement-) blocking software. Because many websites, such as news sites, collect much (if not all) of their revenue from advertisements, the efficacy of an ad (imbedded as a third party object, for example) is lost or reduced when ad-blocking software prevents the external resource of the third party external resources 460 from loading. Thus, ad-blocking results in instances of blocked third party objects.

When ad-blocking software blocks the loading of the external resource of the third party external resources 460, for example, the threshold for loading the external resource of the third party external resources 460 is exceeded, and the timing metric indicates a failure-to-load condition that implicates the presence of an operating ad blocker during the loading of a first portion of a webpage. In such cases, the browser engine can, for example, ask the user to "turn off ad-blocking," verify the proper loading of the ad object (through reloading or refreshing the page, for example), and loading a second portion of the webpage (that includes additional news, photos, and/or more in-depth coverage, for example) in response to the proper loading of the ad object.

Malware blocking software installed by the user can selectively block access to particular third party sites (on a site-by-site basis, for example), such when (inadvertently or otherwise) the web address of the third party site has been added to the malware blacklist. Thus, all accesses to some (but not all) of the third party websites referenced by the service provider 150 are blocked for the consumers 120 that are using the malware blocking software. The service provider 150 can use the alert to determine whether all (for example) of the references to a particular third party site are being blocked (as compared with only some references to the particular third party site being blocked). Where only some of the accesses are being blocked, the service provider 150 can infer the possibility that the third party resource provider 160 has been blacklisted by malware (as compared to being ad-blocked). Comparisons of alerts generated by other consumers 120 (and received by the service provider 150) are used to increase the service provider 150 webmaster's confidence in the inference that the third party resource provider 160 might have been blacklisted by a malware program.

In addition to ad-blocker detection and malware blacklisting detection, the timing metric is also used to detect the likely presence of operating anti-tracking software for a user. When all accesses to third party websites are being blocked by a consumer 120 (as compared to being blocked on occasion by the consumer 120), the service provider 150 webmasters can "flag" the particular consumer as being "untrackable," whether by operation of anti-tracking software or "permanently-on" ad-blocking software.

Using timing metrics obtained from the consumer 120, information such as the HTTP headers associated with the timing metrics, and knowledge of the blocking programs (such as which sites are blocked by anti-virus and/or anti-malware programs), the service provider 150 can determine which blocking program the consumer 120 is presently using. Thus, the service provider 150, for example, can request for the blocking program authors to unblock (e.g., remove from a blacklist) certain sites (and/or resolve the issues that led to a site being blocked). Knowledge of the blocking software can be obtained directly by testing the blocking software on service provider 150 computers (e.g., to find which sites are blocked by the blocking software), as well as by gleaning information from external data sources.

A timing parameter can be sent by the consumer 120 to the service provider 150 for sending an alert when the load time of one of the third party external resources 460 exceeds a certain time to load (e.g., a predetermined threshold). Thus, service provider 150 webmasters are apprised when the third party resource provider 160 is responding too slowly in view of expectations (such as metrics derived from a service level agreement). The alert can also be sent directly to the third party to notify the third party resource provider 160 website.

The service provider 150 webmasters can use the information to, for example, create a statistical map of how often the content fails, based in part on how many page hits the service provider 150 received using any number of other methods (including how many requests were made to the third party that did work). The information can thus be used by the service provider 150 webmasters to notify the third party resource provider 160 webmasters of real-time and/or persistent problems. The persistent problems may be the result of a (for example) government firewall that persistently blocks access (from a consumer's point of view) to the third parties; thus the information is used to identify intractable problems that may call in to question the desirability of the service provider 150 doing business (e.g., by imbedding references to third party content in communications sent to consumers) with the third party resource provider 160.

Likewise the service provider 150 webmasters can request re-payment of funds or invoke other equity equalization mechanisms within a service level agreement between the third party resource provider 160 and the service provider 150. For example, the service provider 150 webmaster can send a second communication addressed to an address associated with the third party resource provider 160 that includes metrics derived from the consumer 120, such that the third party resource provider 160 is provided empirically determined response metrics as viewed from the viewpoint of the consumer 120.

Figure 5:
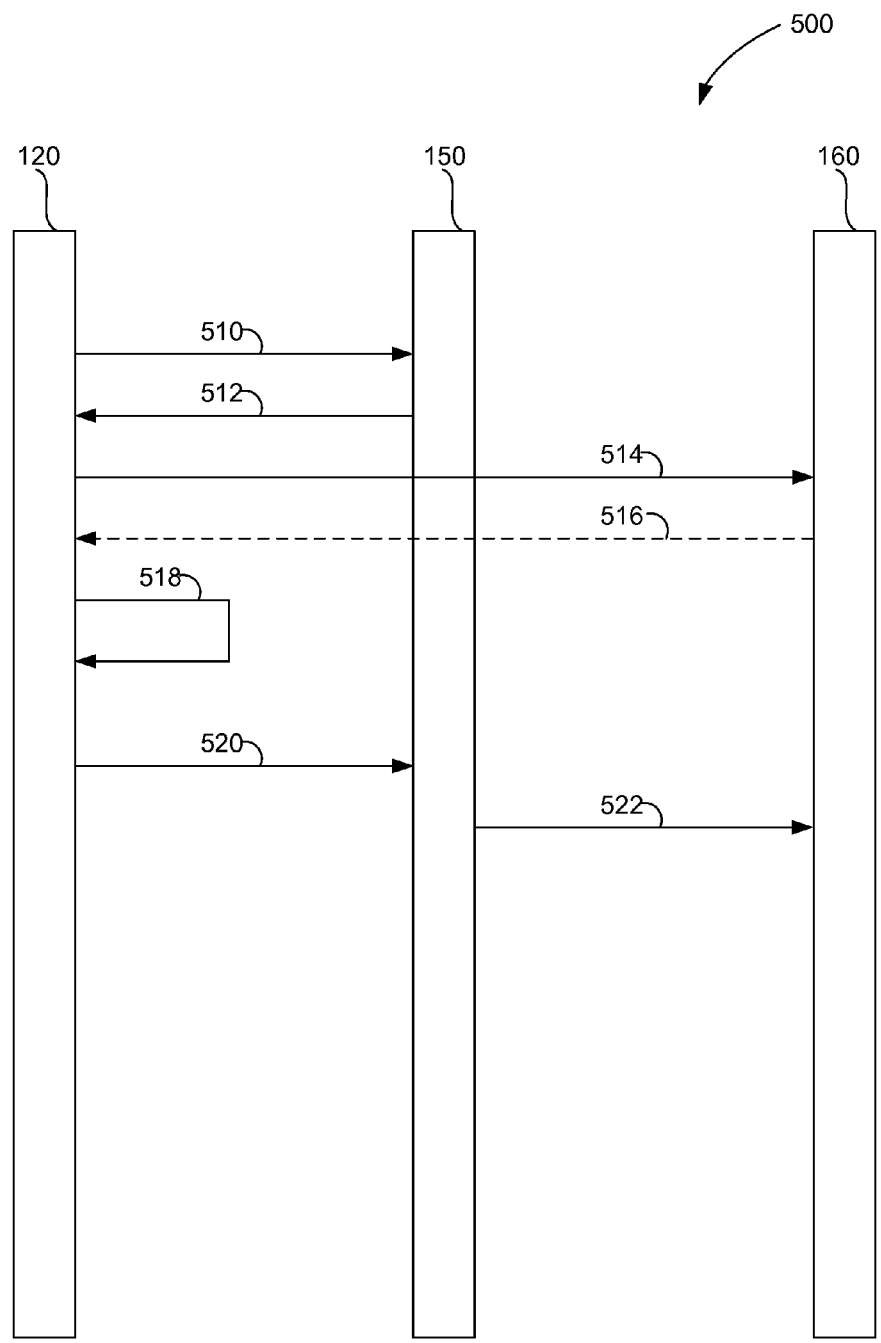
FIG. 5 is a signaling diagram illustrating network element failure detection in accordance with exemplary embodiments of the disclosure.

FIG. 5 is a signaling diagram illustrating in conjunction with FIG. 4 network element failure detection in accordance with exemplary embodiments of the disclosure. Signaling diagram 500 illustrates communications transmitted and received between and amongst the consumer 120, for example, service provider 150, and third party resource provider 160. Consumer 120 generates a request 510 for content from service provider 150. In response, service provider 150 transmits a communication 512 via an external network from a service provider 150 wherein the first communication includes a first reference request for an external resource that is to be transmitted across the external network by a third party service provider 160.

When the communication 512 is received and parsed (for example), consumer 120 transmits to the third party resource provider 160 a request 514 for the external resource across the external network. At that time, the consumer 120 generates a timing metric that is an indication of a current loading status of the requested resource and an indication of the time of the transmission of the request for the external resource. When response 516 of the request for external resources fails to be timely received, consumer 120 also generates a request 518 for a local resource (e.g., when the timing metric can have a value that exceeds a threshold, and the local resource can be specified within the communication).

Consumer 120 transmits an alert 520 to the service provider 150, wherein the alert includes a notification of the timing metric having a value that exceeds a threshold relative to the request for the external resource. The service provider 150 generates a notification 522 and sends the notification 522 to the third party resource provider 160. Notification 522 optionally includes timing metrics (or indications derived therefrom) that are generated by the consumer 120.

Figure 6:
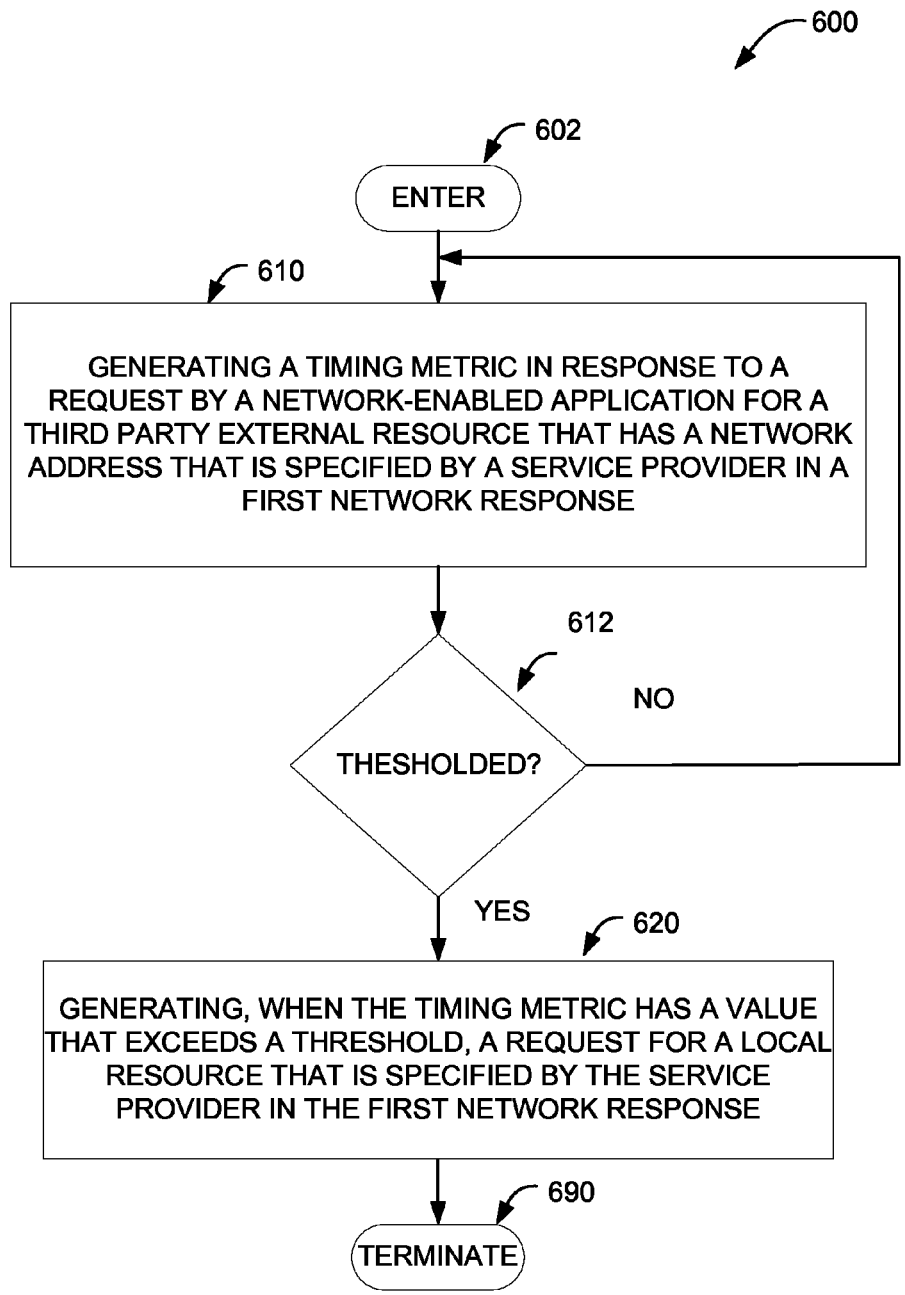
FIG. 6 is a flow diagram illustrating network element failure detection in accordance with exemplary embodiments of the disclosure.

FIG. 6 is a flow diagram illustrating network element failure detection in accordance with exemplary embodiments of the disclosure. The program flow illustrated herein is exemplary, and thus various operations (and various portions of the operations) within the program flow can be performed concurrently and/or in an order that is not necessarily the same as the program flow illustrated herein (including, for example, using logical substitutions and reordering made in accordance with DeMorgan's theorems and Boolean algebra). Program flow 600 begins at node 602 and proceeds to operation 610.

In operation 610, generating a timing metric in response to a request by a network-enabled application for a third party external resource that has a network address that is specified by a service provider in a first network response. For example, the timing metric can be initiated and determined using a timer that is triggered by the transmission of the request by a network-enabled application for the third party external resource. Program flow proceeds to operation 612.

In operation 612, it is evaluated whether a threshold has been (for example) specified in the first network response. If the detection of a threshold is made, program flow proceeds to operation 620. If the detection the threshold is not made, program flow proceeds to operation 610, where timing metrics are generated for anticipated network responses.

In operation 620, when the timing metric has a value that exceeds a threshold, a request is generated for a local resource that is specified by the service provider in the first network response. For example, when the third party resource fails to load within a specified time, a backup (localized) resource can be used to display to a user in place of the third party resource.

The various exemplary embodiments described above are provided by way of illustration only and should not be construed to limit the claims attached hereto. Those skilled in the art will readily recognize various modifications and changes that could be made without following the example exemplary embodiments and applications illustrated and described herein, and without departing from the true spirit and scope of the following claims.

The invention claimed is:

1. A method, comprising the following computer-implemented operations:
generating a timing metric in response to a request by a network-enabled application for a third party external resource that has a network address that is specified by a service provider in a first network response; and
generating, when the timing metric has a value that exceeds a threshold that is specified by the service provider in the first network response, a request for a local resource that is specified by the service provider in the first network response.

2. The method of claim 1, wherein the network enabled application is a browser that responsive to user input from a person.

3. The method of claim 1, wherein the first network response is received in response to an initial request transmitted by the network-enabled application to the service provider.

4. The method of claim 3, wherein the timing metric is an indication of a current loading status of the first requested resource relative to the time of a transmission of the request by the network-enabled application for the third party external resource.

5. The method of claim 4, wherein the current loading status is determined in response to a second network response that is generated by the third party external resource.

6. The method of claim 5, further comprising transmitting an alert to the service provider when the timing metric has a value that exceeds the threshold.

7. The method of claim 6, wherein the alert comprises a value that is indicative of the timing metric.

8. The method of claim 7, wherein the timing metric is selected in response to the type of resource that is identified by the third party external resource.

9. The method of claim 8, wherein the current loading status is an indication of the degree to which a response to the first request for the third party external resource from the third party has been received.

10. The method of claim 9, wherein first network response includes a contingency tag that is used to specify the local resource when the timing metric has a value that exceeds the threshold.

11. The method of claim 10, wherein the first network response is parsed by a document object model (DOM) of the network-enabled application to identify the local resource and replacement information to be used by the local resource, wherein the first network response includes a link for downloading the replacement information.

12. The method of claim 1, wherein the timing metric is determined using a timer that is used to measure the time period between the time of a transmission of the request by the network-enabled application for the third party external resource and a time that is determined in response to the threshold.

13. The method of claim 12, wherein the first network response is encoded using one of a markup language, cascading style sheet (CSS), and JavaScript that is arranged to be executed using the network-enabled application.

14. The method of claim 13, wherein content of the local resource is displayed to a user in place of displaying at least a portion of the third party external resource.

15. The method of claim 1, wherein the local resource is transmitted from the service provider across an external network to the network-enabled application before the completion of a transmission of the request by the network-enabled application for the third party external resource.

16. A non-transitory, tangible medium including instructions that, when executed on a processor of an electronic system, comprise:
generating a timing metric in response to a request by a network-enabled application for a third party external resource that has a network address that is specified by a service provider in a first network response; and
generating, when the timing metric has a value that exceeds a threshold that is specified by the service provider in the first network response, a request for a local resource that is specified by the service provider in the first network response.

17. The medium of claim 16, wherein the first network response is received in response to an initial request transmitted by the network-enabled application to the service provider.

18. The medium of claim 17, further comprising transmitting an alert to the service provider when the timing metric has a value that exceeds the threshold.

19. The medium of claim 18, wherein the timing metric is determined using a timer that is used to measure the time period between the time of a transmission of the request by the network-enabled application for the third party external resource and a time that is determined in response to the threshold.

20. The medium of claim 19, wherein the local resource is transmitted from the service provider across an external network to the network-enabled application before the completion of the transmission of the request by the network-enabled application for the third party external resource.

21. A client machine, comprising:
a timing metric generator that is arranged to generate a timing metric in response to a request by a network-enabled application for a third party external resource that has a first network address that is specified by a service provider in a first network response; and
a resource requester that is arranged to generate, when the timing metric has a value that exceeds a threshold that is specified by the service provider in the first network response, a request for a local resource that is specified by the service provider in the first network response.

22. The client machine of claim 21, wherein the threshold is specified by the service provider in the first network response.

23. The client machine of claim 22, wherein the first network response is received in response to an initial request transmitted by the network-enabled application to the service provider.

24. The client machine of claim 23, wherein the timing metric is an indication of a current loading status of the first requested resource relative to the time of a transmission of the request by the network-enabled application for the third party external resource.

25. The client machine of claim 24, comprising transmitting an alert to the service provider when the timing metric has a value that exceeds the threshold, wherein the alert comprises a value that is indicative of the timing metric.

26. The client machine of claim 25, wherein the timing metric is selected in accordance with a number of system events that occur after the transmission of the request by the network-enabled application for the third party external resource.

27. The client machine of claim 26, wherein first network response includes a third party external resource that has a second network address that is different from the first network address that is specified by the service provider in a first network response.

28. The client machine of claim 24, wherein the first network response is encoded using one of a markup language, cascading style sheet (CSS), and JavaScript that is arranged to be executed using the network-enabled application.

29. The client machine of claim 28, wherein content of the local resource is displayed to a user in place of displaying at least a portion of the third party external resource.

30. The client machine of claim 25, wherein the local resource is transmitted from the service provider across an external network to the network-enabled application before the completion of the transmission of the request by the network-enabled application for the third party external resource.

* * * * *